United States Patent [19]

Stubbings

[11] 4,051,342
[45] Sept. 27, 1977

[54] CONTINUOUS WELDER

[75] Inventor: James Henry Stubbings, Rockville, Md.

[73] Assignee: Potomac Applied Mechanics, Inc., Bethesda, Md.

[21] Appl. No.: 656,590

[22] Filed: Feb. 9, 1976

[51] Int. Cl.² .......................... B23K 9/02; B23K 9/12
[52] U.S. Cl. ................................. 219/60 A; 219/124; 219/125 R; 219/137 R; 266/56
[58] Field of Search ...................... 219/59, 60 A, 60 R, 219/124, 125 R, 137; 228/45; 266/56

[56] References Cited

U.S. PATENT DOCUMENTS

| | | | |
|---|---|---|---|
| 3,084,244 | 4/1963 | Rieppel et al. | 219/60 A |
| 3,207,881 | 9/1965 | Pagan | 219/60 A |
| 3,266,700 | 8/1966 | Bauer et al. | 219/60 A |
| 3,306,116 | 2/1967 | Ross et al. | 219/124 X |
| 3,361,319 | 1/1968 | Sato et al. | 219/59 X |
| 3,427,428 | 2/1969 | Nelson et al. | 219/125 R |
| 3,633,813 | 12/1972 | Looney et al. | 219/60 A |

Primary Examiner—J. V. Truhe
Assistant Examiner—N. D. Herkamp
Attorney, Agent, or Firm—Cushman, Darby & Cushman

[57] ABSTRACT

A continuous welder automatically moves from one joint to the next along a pipeline of pipes to be welded together, and automatically adapts to pipes of different diameter. At each joint, a wire-fed welding nozzle revolves around the pipes to weld the pipes together, the welding nozzle making a root pass, an overlap pass, and a wash pass, to complete a permanent weld at the joint. During each pass the welding nozzle is oscillated in a different path by selectable oscillating apparatus therefor, the particular oscillating apparatus utilized being automatically changed on each pass. The welding nozzle revolves around the pipes under the power of rotating planetary gear sets which are engaged with mounting rings for the gear sets.

25 Claims, 8 Drawing Figures

CONTINUOUS WELDER

BACKGROUND AND SUMMARY OF THE INVENTION

The invention relates to an automatic welding assembly for welding together adjacent pipes, at a joint therebetween, of a generally horizontally disposed pipeline. There are a number of prior art devices for welding together adjacent pipes of a pipeline, however, such prior art devices are not automatic, but are rather semi-automatic and must either be disassembled for movement to a new position or otherwise manually moved into a different position once one welding operation is completed. Such prior art devices are generally useful for welding together pipes of the same diameter, however, no provision is made therein for welding transitions of pipes of different diameter, nor for accommodating pipes all of the same diameter, but of a size different than a single design size of the device. Such prior art devices also do not provide for making of a complete weld at each joint between pipes by revolving a welding nozzle around the joint a plurality of times, each time with a different welding pattern of the nozzle taking place, nor do the prior art devices provide as positive of a means for supporting the rotation of a welding nozzle with respect to the pipes to be welded. Typical prior art devices, having one or more of the above-mentioned drawbacks, are disclosed in U.S. Pat. Nos. 3,084,244, 3,256,418, 3,681,560, 3,681,564, 3,702,913, 3,777,103 and 3,783,222.

The welding assembly according to the present invention includes a welding nozzle and associated apparatus, means for mounting the welding nozzle for revolution around pipes to be welded, the nozzle being disposed adjacent the joint between the pipes to be welded together, means for supporting the mounting means for movement along the length of the pipe from one joint to the other, means for powering the supporting means to provide for automatic movement from one position to the next, and means for adapting the supporting means to transitions and pipes of different diameter as the assembly is automatically moved from one welding position to the next. The mounting means for the welding nozzle and associated apparatus includes a pair of rings encircling the pipes, each ring having an upper gear-toothed surface thereof concentric with the pipes, and a lower gear-toothed surface thereof concentric with the pipes and disposed closer to the pipes than the upper surface. Means are provided for horizontally spacing the rings from each other. A plurality of planetary gear sets may be associated with each ring in operative engagement with the gear-toothed surfaces thereof, each planetary gear set including three circular gears, two in engagement with one gear-toothed surface, and the other in engagement with the other gear-toothed surface, and an idler disposed between the circular gears and in operative engagement with each of them. Alignment means are disposed between the circular gears to insure proper alignment therebetween, and at least one of the circular gears is powered by a motor associated with the welding nozzle and associated apparatus.

The welding nozzle is supplied with welding wire from a spool which is automatically driven to provide the correct amount thereto, and means are provided for oscillating the welding nozzle in a particular oscillator path during a welding pass. A feeler precedes the welding nozzle during its movement around the pipes, and senses the weld in the joint to change the oscillatory path of the welding nozzle at the start of each pass. Preferably three passes are made at each point, a root pass, an overlap pass, and a wash pass. When all the passes are completed, the assembly is ready to move on to the next joint. Means are provided for moving the welding nozzle radially so that it is always is proper position for welding.

Each of the supporting means for the mounting means includes a plurality of rotatable rod members operatively connected to one of the mounting rings, a wheel assembly connected to one end of the rod members for engagement with the exterior surface of the pipes, motor means for rotating the rod members, means for transforming rotary movement of the rod members into radial movement of the wheel assemblies with respect to the rings, and feeler means associated with each wheel assembly for automatically controlling the rotation of the rod members to automatically adapt the welding assembly to pipes of different diameters. At least one wheel assembly associated with each ring is driven by a motor mounted therewith.

It is the primary object of the present invention to provide an improved welding assembly that automatically moves from one joint to the next for welding pipes of a pipeline, and which can adapt to pipes of different diameter and which can make a permanent weld at each joint. This and other objects of the invention will become clear from an inspection of the detailed description of the invention, and from the appended claims.

DETAILED DESCRIPTION OF THE INVENTION

Figure 1:
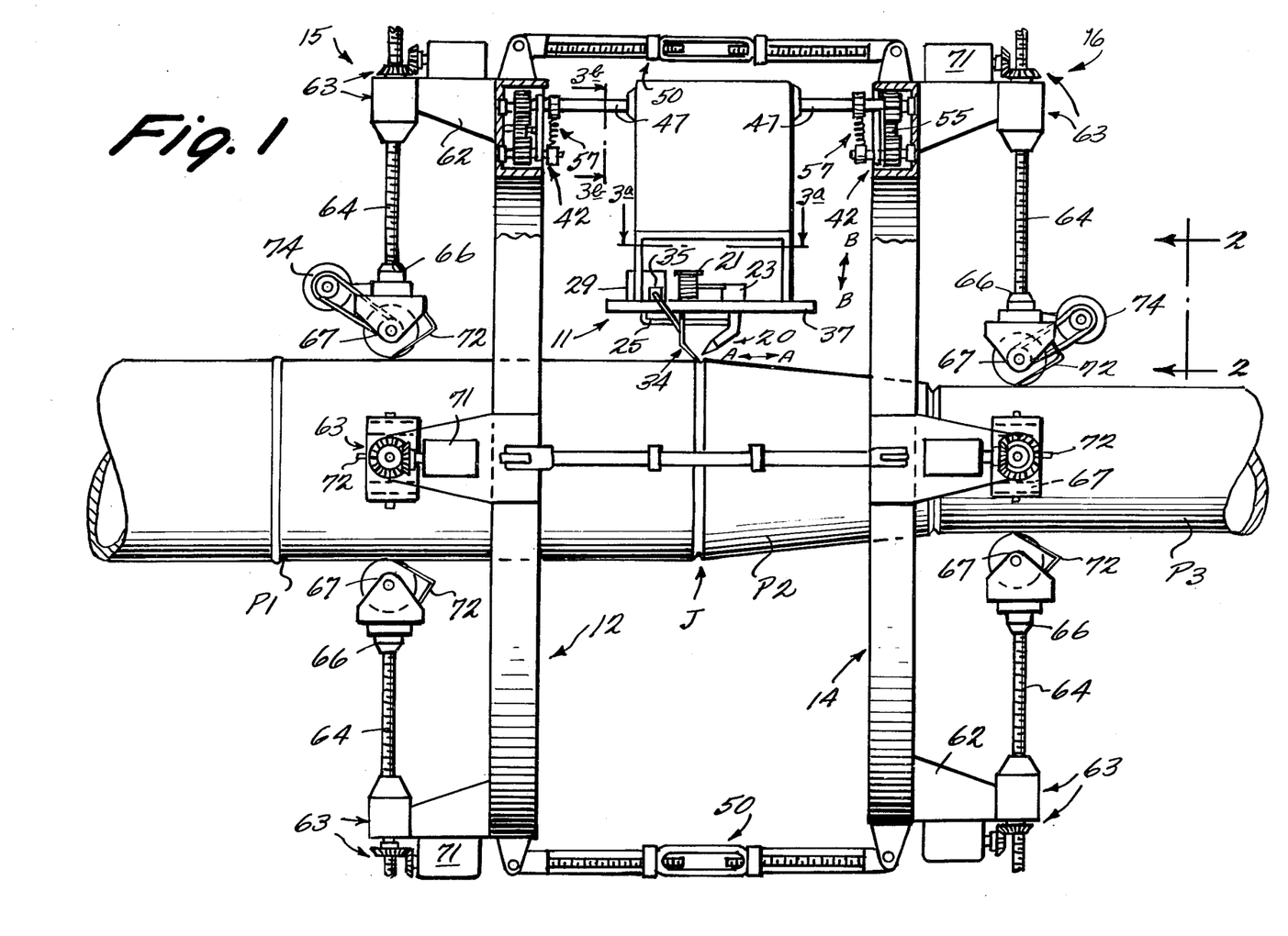
FIG. 1 is a side view, with some parts in section, of an exemplary welding apparatus according to the present invention.

An exemplary welding assembly for making a circumferential weld between adjacent pipes at a joint therebetween is shown generally at 10 in FIG. 1. The assembly 10 is shown in operative relationship with three different pipes, P1, P2 and P3; the pipes P1 and P3 being of different diameter and the pipe P2 being a transition pipe between the pipes P1 and P3. While the assembly 10 according to the present invention may be utilized with pipes of constant diameter in a pipeline, it is especially useful where the pipes in a pipeline are of varying diameter.

The assembly 10 shown in FIG. 1 includes several main components: welding nozzle assembly 11 for making circumferential welds at the joints J between two pipes P1 and P2 in FIG. 1, to be welded together, means for mounting said welding nozzle assembly 11 exteriorly of the pipes to be welded for substantially 360° movement around the pipes, including a pair of horizontally spaced rings, 12, 14, means 15, 16 for supporting the welding nozzle mounting means 12, 14 for movement along the pipes on the exterior thereof from one joint J to the next, and means 17 for powering the supporting means 15, 16 for automatic movement of the welding nozzle assembly 11 for one joint J to the next.

Figure 3A:
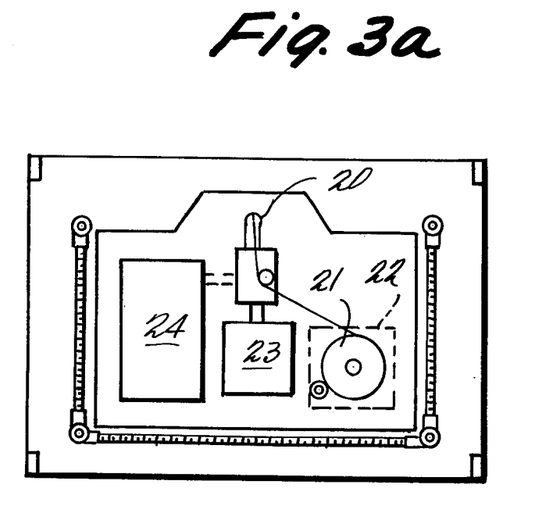
FIG. 3a is a top view of the actual revolving welding assembly of FIG. 1, taken along lines 3a—3a of FIG. 1.

The welding nozzle assembly 11, as shown most clearly in FIGS. 1 and 3a, includes a welding nozzle 20 fed with wire welding rod from a wire spool 21, such as shown in U.S. Pat. No. 3,084,244. Any suitable conventional welding wire may be used such as those available commercially from Linde (see Linde catalog NWSA 600-699, Sec. 170, Item 0, part 15, page 16, wherein a number of suitable welding wires are listed). If desirable, an oven (shown on dotted line at 22, FIG. 3a) may be disposed around the welding wire spool 21 to bake out any moisture that may be present in the wire on spool 21 to increase the efficiency of the welding performed by the nozzle 20. A wire spool control apparatus 23 controls the feed of the wire to the nozzle 20 to insure proper feeding thereof.

Figure 4:
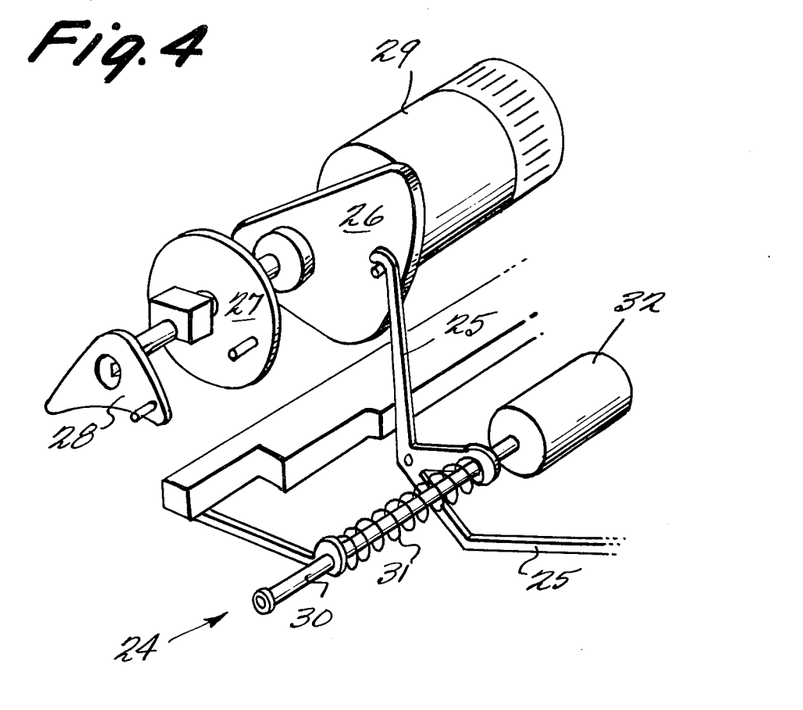
FIG. 4 is a schematic showing of an exemplary welding nozzle oscillating means according to the present invention.

The welding nozzle 20 is disposed just above the joint area J of two pipes P1, P2 to be welded together, the welding nozzle 20 maintaining the same relationship with the joint J as it passes circumferentially around the joint, making a circumferential weld thereat. In most situations wherein a permanent circumferential weld is desired between the pipes P1, P2, it is desired that the welding nozzle 20 makes three passes around the pipes at each joint J, the first pass being a root pass, the second pass being an overlap pass and the third pass being a wash pass. The welding action of the nozzle 20 during each of the different passes around the joint J is slightly different, the difference being in part due to the oscillation of the welding nozzle 20 in direction A—A in the slightly different oscillator path during each pass around the joint J. Means for oscillating the welding nozzle 20 is shown generally at 24 in the drawings, and includes any suitable means for oscillating the nozzle 20, such as cam-following rod 25 attached to the nozzle 20, and in selective engagement with one of a plurality of cams 26, 27, 28. A schematic showing of an exemplary nozzle oscillating means 24 is provided in FIG. 4, including a motor 29 for continuously rotating cams 26, 27, 28 (each having a different configuration corresponding to a different oscillatory path of the nozzle 20, and a different weld), a shaft 30 for mounting a portion of the cam-follower 25 therein, the follower being movable along the shaft 30 and spring-biased by spring 31, and a servomotor 32 for moving the cam-follower 25 and the shaft 30 relative to each other to move the follower 25 from operative relationship with cam 26, to operative relationship with cam 27, to operative relationship with cam 28, depending upon which oscillatory path of movement of the nozzle 20 is desired. While such as oscillatory path selecting means is desirable, it is to be understood that such a means is only exemplary, and other oscillatory path moving means could be provided, such as that shown in U.S. Pat. No. 3,681,564.

Figure 6:
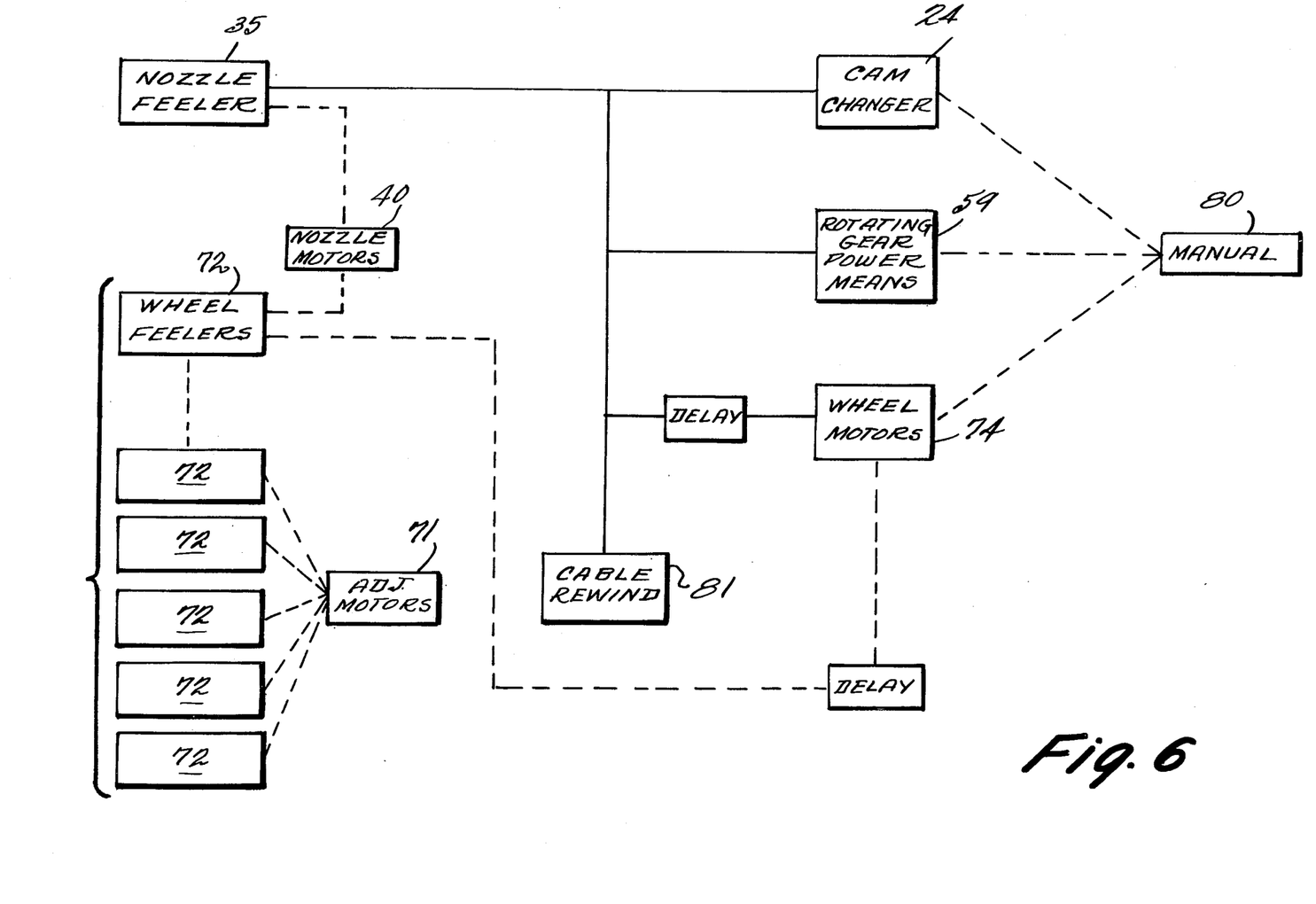
FIG. 6 is a schematic view of exemplary control means that may be utilized for the apparatus of FIG. 1.

The oscillatory path in which the nozzle 20 is to be moved is automatically selected during each pass of the nozzle 20 around the joint J. A feeler 34 is provided in front of the nozzle 20 along its circumferential path of movement during welding, the feeler 34 riding in the joint J between the pipes to be welded. The feeler 34 is operatively connected to a control 35 for servomotor 32, which controls the selection of the cam 26, 27, 28, to be placed in operative relationship with the follower 25. After one complete pass around the pipes by the nozzle 20 has been made, there will be a weld in the joint J at the starting point for the welding operation, and this weld will be sensed by the feeder 34, which will be cammed upwardly by the existing weld, and actuate control 35, and subsequently servomotor 32. The feeler 34 may also be connected to other controls for other motors associated with the assembly 10, as will be more fully explained hereinafter (see FIG. 6). In addition to the feeler 34 associated with the nozzle 20, a heater not shown may be provided in front of the nozzle 20 along its circumferential path of movement for preheating the pipes at the joint J when the ambient temperature is too low (i.e., below 40° F) in order to provide a proper weld at the joint J. Also, an automatic slag hammer not shown may be provided to follow the nozzle 20 when particular welding wire is used (i.e., low hydrogen wire with flux).

The nozzle 20, control 24, feeler 34, etc., of the welding assembly 11 are mounted on a platform 37 that is adapted to be disposed above a joint J. The platform 37 is mounted for radial movement (in direction B—B) to adjust the distance of the welding nozzle 20 from the tops of the rings 12, 14 of the welding assembly mounting means, so that proper welding will be achieved no matter what the diameter of the pipes being welded are with respect to the diameter of the rings 12, 14. Means for mounting the platform 37 for radial movement may comprise a plurality of screw-rods 38 mounted to the platform for relative rotary movement with respect thereto, but no relative linear movement with respect thereto, a support 39 for guiding the rods 38, and means 40 associated with each rod for rotating the rod, the rotary movement of each of the rods being changed by the connections 41 of the rods 38 to platform 39 into linear movement thereof. The power means 40 for rotating the rods 38 may be automatically controlled by feelers associated with the supporting means 15, 16 as will be more fully explained hereinafter (see FIG. 6).

Figure 3B:
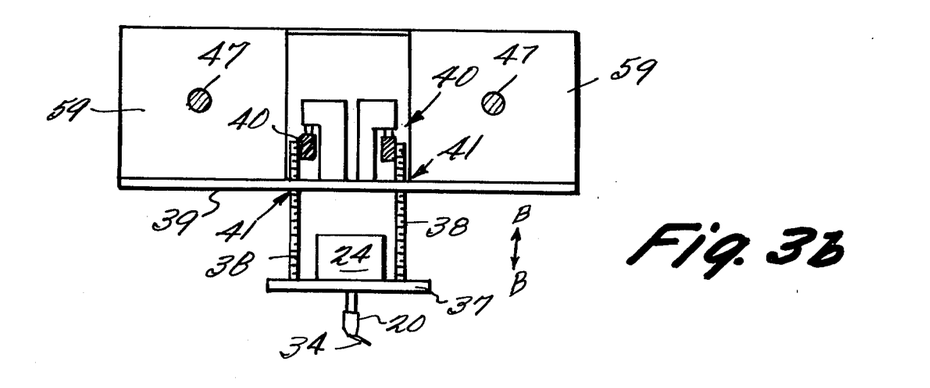
FIG. 3b is a side view of the actual revolving welding assembly of FIG. 1, taken along lines 3b—3b of FIG. 1.
Figure 5:
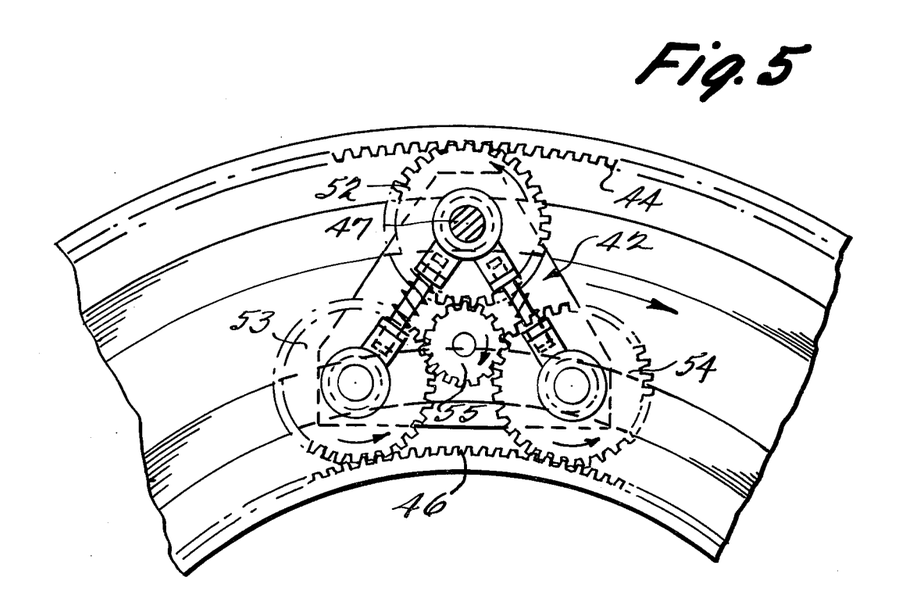
FIG. 5 is a detailed view of exemplary gear members according to the present invention cooperating with a gear ring for rotation with respect thereto.

The mounting means for mounting the welding assembly for substantially 360° movement around the circumference of the pipes during welding thereof, in addition to including rings 12, 14, includes gear members operatively associated with the welding assembly 11, shown generally at 42 in the drawings (see FIGS. 1 and 5 in particular). Each ring member 12, 14 comprises an upper gear-toothed surface 44 which is concentric with the pipes to be welded, and a lower gear-toothed surface 46, opposite surface 44, which is also concentric with the pipes to be welded. The rings 12, 14 are spaced from each other a given distance in the horizontal direction (along the length of the pipeline of pipes to be welded) by shafts 47, associated with the gear members 42, and also preferably by a plurality of turnbuckle members 50 disposed circumferentially around the rings 12, 14 and each member 50 attached to the rings 12, 14. The member 50, of course, may be adjusted to make sure that the rings 12, 14 have the surfaces 44, 46 thereof disposed in completely concentric relationship with the pipes to be welded, so that a true even weld is obtained. The gear members 42 comprise planetary gears that rotate with respect to the rings 12, 14 the gear-toothed surfaces 44, 46 being stationary with respect to the members 42, and the members 42 revolving around the pipes as they rotate. One form that the gear members 42 may take is shown most clearly in FIG. 5, and includes three circular gears 52, 53 and 54 associated with each ring 12, 14, the gear 52 being in engagement with the upper gear-toothed surface 44 of one of the rings 12, 14 and the gears 53, 54 being in engagement with the lower surface 46 of one of the rings 12, 14. An idler gear 55 is disposed between the gears 52, 53, 54, the teeth of the idler gear 55 being in engagement with the teeth of the gears 52, 53 and 54. Also, there preferably is a pair of alignment adjustment assemblies 57 associated with each of the gear sets 42, each alignment assembly 57 including an adjustable spring-biased arrangement for controlling the relative alignment between the gears 52, 53, and 54 and for providing sufficient engaging forces between the gears 52, 53 54 and the idler gear 55. At least one of the gears 52, 53, 54 of each set is powered, as shown in FIGS. 1 and 5, the gear 52 being powered, and rotation of gear 52 being transferred to rotation of gears 53, 54 by the idler gear 55. The gear 52 is powered by a shaft 47, which is in turn powered by a motor shown schematically at 59, which motor 59 is stationarily secured to platform 39, rotation of the shaft 47 by the motor 59 results in revolution of the welding assembly 11 around the pipes to be welded. While only one shaft 47 and associated gear members 2 (with each ring 12, 14) may be provided, to insure provision of the welding nozzle 20 in a secure position during revolution thereof, a pair of shafts 47 may be provided, each with a power means 59 and a pair of sets of gear members 42 associated therewith as shown in FIG. 3b.

The supporting means 15, 16 for the mounting means for the welding assembly 11, include means that allow the welding assembly to be moved automatically along the length of the pipes to be welded, and to adapt to pipes of different diameters. The means 15, 16 include at least three supports 62 (four are shown in the drawings) secured to each ring 12, 14 and extending therefrom along the direction of elongation of the pipes P1, P2, P3 (extending in the horizontal direction A-A). Each support 62 includes a bushing member 63 and a rod 64 associated therewith, each bushing member 63 being of any conventional type for transferring the rotation of the rod 64 into linear radial movement (in direction B-B) of the wheel assembly 65 attached to the end of the respective rod 64 including bevel gears 63' associated with bushing 63. Each rod 64 is mounted for relative rotation, but no relative linear movement, to each wheel assembly 65 by a bushing 66 or the like. Each assembly 65 preferably includes a pair of wheels 67 adapted to roll along the exterior of a pipeline, the wheels being mounted for rotation by a shaft 68 or the like, and being operatively connected to bushing 66 by a fork member 69. In order to withstand the heat to which they may be subjected, even though they are located remotely from the nozzle 20, the wheels 67 may be made of polytetrafluoroethylene ("Teflon").

A motor 71 is provided and associated with each support 62 for rotating the rod 64 associated therewith in response to the wheels 67 encountering pipes of different diameter to insure that the wheels 67 stay in contact with the exterior surface of the pipes on which they are riding. The motor 71 associated with each support 62 is actuated by a feeler 72 associated with the wheel assembly 65 for the support 62. The feeler 72, which may be disposed between the wheels 67, engages the surface of the pipe on which the wheels 67 are riding, and in response to the position of that surface actuates a control means for the motor 71 associated therewith to cause the motor to rotate the rod 64 to either raise or lower the wheel assembly with respect to the support 62. The feelers 72 may precede the wheel assemblies 65 if desired.

Figure 2:
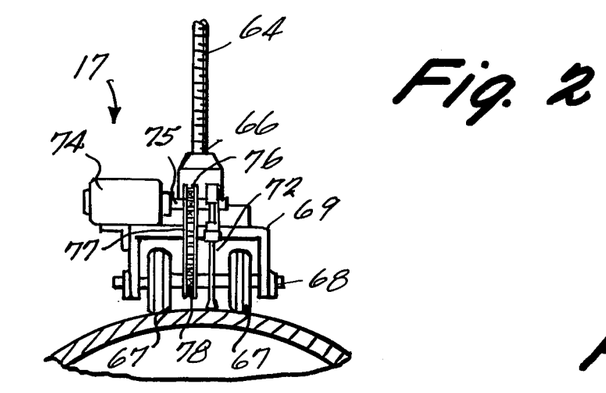
FIG. 2 is a partial end view of the apparatus of FIG. 1 taken along lines 2—2 of FIG. 1.

A motor 74 which comprises powering means 17, is associated with at least one of the wheel assemblies 65 of the plurality of supports 62 of supporting means 15, 16. As shown in FIG. 1, a motor 74 is provided for one wheel assembly 65 associated with support 15 of the four wheel assemblies 65 associated with support 15, and similarly for support 16. As shown most clearly in FIG. 2, the drive shaft 75 of motor 74 has a gear 76 attached thereto, and a chain 77 passes over gear 76 and then over gear 78 associated with shaft 68. Rotation of shaft 75 thus results in rotation of the shaft 68, and driving of the wheels 67 to move the whole welding assembly 10 along the pipeline from one joint to another. The motor 74 may be controlled manually by a single operator for the whole assembly 10, or it may be controlled automatically, being started when the welding nozzle 20 has made its third pass at a given joint J in response to the control 35 actuated by the feeler 34, see FIG. 6, and being stopped after a time delay when the feelers 72 detect another joint J in the pipeline. The motors 74 preferably have a magnetic stop associated therewith, and securely stop and hold the wheels 67 in place once a desired position is reached.

Electric power may be provided for each of the motors 32, 40, 59 and for welding nozzle 20 through cables from a mobile source of power or the like; cables may also serve motors 71, 74. If cables are provided and associated with motors 59, a suitable reel mechanism shown schematically at 81 in FIG. 6, must be provided in order to insure that the cable does not get tangled up as the welding assembly 11 revolves around the pipes to be welded. After a joint is welded, with such a cable and reel mechanism 81, it would be necessary to drive the motors 59 in reverse to rewind the cable before the next joint was reached and the next welding action initiated. Alternatively, the current to power the motors 59 and nozzle 20 could be picked up by the gear members 42, off the rings 12, 14 and transmitted by the shafts 47 or conductors associated therewith to the motors 59 and nozzle 20. Alternatively, the motors 59 could be gasoline powered, or contain some other sort of self-contained power supply.

An x-ray machine could also be provided in association with the welding assembly 10 according to the present invention, the x-ray machine determining whether or not welds made by the nozzle 20 are proper, and if there is some flaw in the welds, the assembly 10 could be driven backwardly to the joint with the flawed weld, and another pass made with the nozzle 20, manual controls 80 optionally being provided for all of the motors associated with the assembly 10.

Figure 7:
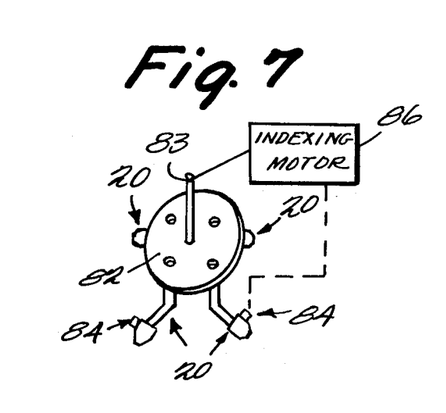
FIG. 7 is a schematic showing of a modified arrangement for welding nozzles according to the present invention.

As a further modification of the present invention, instead of providing a single nozzle 20 for the assembly 11, a plurality of nozzles could be provided as shown diagrammatically in FIG. 7. For instance, four nozzles 20 could be provided and mounted on a plate 82 or rotated about a common axis 83. Only one nozzle 20 is in operative communication with the wire feed 23 at one time. As a nozzle 20 became corroded or clogged up during continuous operation thereof, a sensing means 84 located adjacent to the nozzle 20 could sense such a clogged condition. This sensing means would automatically actuate an indexing motor 86 for rotating a new nozzle 20 into place by rotation of plate 82. The new nozzle 20 would then be in operative communication with wire feed 23, and operation of the invention could be continued. Additionally, a TV camera, not shown, or the like could be mounted with the assembly 11 to follow the welding nozzle(s) 20 as it revolved around the joint J in order to allow an operator to monitor the condition of the weld being formed along the joint J. The TV camera could have an arrangement of lenses associated therewith similar to the arrangement of nozzles 20 on plate 82. Four lenses are mounted on a rotatable plate, and a sensor automatically switches the camera from one lens to the next, by a suitable conventional means, when a lens become clouded up or otherwise inoperative.

A preferred embodiment of the invention now having been described a mode of operation thereof, will now be set forth: The assembly 10 is disposed around pipes of a pipeline to be welded, the rings 12, 14 preferably each being formed of two half circles which are attached together around the pipes, the turnbuckles 50 and shafts 47 already properly spacing them, and the gear members 42 and supports 62 already in operative association therewith. The power means 17 are then actuated, and the wheels 67 drive the assembly to position over a joint J that is to be welded, and stopped in place thereover. If a transition pipe P2 is to be welded to pipes P1, P3 of different diameter, the feelers 72 will sense the change in diameter of the pipes it is travelling across, and will control motors 71 associated with each wheel assembly 65 to rotate the shafts 64 to ensure that the wheels 67 remain in contact with the exterior surfaces of the pipes on which they are travelling. When the desired position is reached, the welding nozzle 20 is supplied with electricity, and the wire feeder 23 associated therewith is actuated to control the feed of wire to the nozzle 20, and the motors 59 are started, rotating the gears 52 associated with gear members 42, and driving the welding assembly 11 circumferentially around the pipes as the nozzle 20 makes a weld at the joint J. The drive means 40, either in response to the feelers 72 or in response to some other means, have moved the welding nozzle 20 radially into the optimum position for welding of the pipes at the joint J.

The welding assembly makes three passes around the pipes P1, P2, the start of each pass being sensed by the feeler 34, and the control means 24 accordingly selecting the proper cam for oscillating the nozzle 20 in a desired oscillating path as the welding takes place. At the end of the third pass, the feeler 34 terminates the rotation of the shafts 47 by the motors 59, and initiates movement of the whole welding apparatus 10 to the next pipe joint J by starting operation of the motors 74, which takes place either after or during rewinding of the cable supplying electricity to the assembly 11 if cables are utilized for supplying electricity. The formed weld is inspected with an x-ray machine, and if it is not proper, the assembly 10 is driven backwardly into place over the joint J, and another weld is made thereat.

While the invention has been herein shown and described in what is presently conceived to be the most practical and preferred embodiment of the invention, it will be apparent to those of ordinary skill in the art that many modifications thereof may be made within the scope of the invention. For instance, interior support means for the pipes may be provided, such as is shown at 424 in U.S. Pat. No. 3,681,560, and accessory means for latching the assembly 10 in place during welding, such as is shown in U.S. Pat. No. 3,084,244. Many other modifications are of course also possible. Thus, the invention is to be accorded the broadest interpretation of the appended claims so as to emcompass all equivalent structures and devices.

What is claimed is:

1. A welding assembly for welding together adjacent ends at a joint of substantially horizontally disposed pipes of a horizontal pipeline comprising
    a welding nozzle mounted exteriorly of pipes to be welded together,
    means for mounting said welding nozzle exteriorly of pipes to be welded together for substantially 360° movement around said pipes to circumferentially weld adjacent pipes together,
    means for supporting said welding nozzle mounting means for substantially horizontal movement on said pipes on the exterior thereof,
    means for powering said support means for automatic movement of said welding nozzle from one joint between two pipes to another joint between two pipes along said pipelines, and
    automatic adjustment means for mounting said supporting means so that said supporting means can adapt to pipes of different diameter automatically and so that transition pipes may be welded to pipes of different diameters at either end thereof.

2. A welding assembly as recited in claim 1 wherein said supporting means for said welding nozzle mounting means comprises a plurality of wheels for engagement with the exterior of adjacent pipes to be welded and wherein said automatic adjustment means for mounting said supporting means comprises a plurality of radially fixed supports, a screw rod passing through each support and in operative engagement with one of said wheels, and means for rotating each of said screw rods for linear movement with respect to said radially fixed supports in the radial direction and means associated with each of said wheels for sensing the diameter of a pipe on which the wheel is rolling and activating said screw rod rotating means in response to a pipe diameter change.

3. A welding nozzle as recited in claim 2 further comprising means for moving said welding nozzle radially with respect to said pipes to be welded.

4. A welding assembly as recited in claim 2 wherein said mounting means for said welding nozzle includes a pair of rings encircling pipes to be welded, means for spacing said rings horizontally apart a predetermined distance and means for providing relative movement in a circumferential path between said rings and said welding nozzle.

5. A welding assembly as recited in claim 4 wherein said supporting means for said welding nozzle mounting means comprises a set of at least three wheels, of said plurality of wheels for engagement with the exterior of adjacent pipes associated with each of said rings.

6. A welding assembly as recited in claim 5 wherein said means for powering said supporting means comprises motor means mounted in operative engagement with at least one of said wheels of each of said sets of wheels.

7. A welding assembly as recited in claim 1 further comprising means for oscillating said welding nozzle as said welding nozzle is rotated in a circumferential path around said pipes to be welded.

8. A welding assembly as recited in claim 7 wherein said welding nozzle oscillating means comprises a plurality of cams for operative engagement with said welding nozzle, and means for selectively bringing one of said cams into operative engagement with said welding nozzle.

9. A welding assembly as recited in claim 7 further comprising means for moving said welding nozzle in a different oscillatory path during each pass of said welding nozzle around the circumference of a pair of pipes to be welded during welding of the joints between one pair of pipes.

10. A welding assembly as recited in claim 9 further comprising sensing means for sensing the presence of a welding bead in the joint area between adjacent pipes to be welded and for automatically actuating said welding nozzle moving means in response to said sensing.

11. A welding assembly as recited in claim 1 wherein said mounting means for said welding nozzle includes a pair of rings encircling pipes to be welded, means for spacing said rings horizontally apart a predetermined distance and means for providing relative movement in a circumferential path between said rings and said welding nozzle.

12. A welding assembly as recited in claim 11 further comprising a plurality of gear teeth formed on interior surfaces of each of said rings, a plurality of circular gears operatively connected to said welding nozzle and in engagement with said gear teeth formed on the interior surfaces of said rings, means for mounting said circular gears for rotation relative to said rings, and power means for rotating at least one of said circular gears so that said circular gears rotate with respect to said rings and move said welding nozzle in its circumferential path.

13. A welding assembly as recited in claim 12, wherein three circular gears are provided associated with each of said rings, said circular gears being located generally at the vertises of an equilateral triangle, and an idler gear being located in a median portion between said circular gears and in operative engagement with each of said gears.

14. A welding assembly as recited in claim 13 further comprising a pair of alignment members extending between one of said circular gears and the other two of said circular gears.

15. A welding assembly as recited in claim 14, wherein each of said rings comprises an upper gear-toothed surface and a lower gear-toothed surface, each of said surfaces being concentric with pipes to be welded, and said lower surface being closer to said pipes than said upper surface, one of said circular gears being in engagement with said upper surface, and the other of said circular gears being in engagement with said lower surface.

16. A welding assembly as recited in claim 13 further comprising two sets of three circular gears each being associated with each ring.

17. A welding assembly for welding together adjacent ends, at a joint, of substantially horizontally disposed pipes comprising a. welding nozzle mounted exteriorly of pipes to be welded together, b. means for mounting said welding nozzle exteriorly of pipes to be welded together for substantially 360° movement around said pipes to make a circumferential weld of adjacent pipes together, said means including
  i. a pair of rings encircling adjacent pipes to be welded together,
  ii. means for spacing said rings horizontally apart a predetermined distance,
  iii. each of said rings having an uppergear toothed surface and a lower gear-toothed surface, both of said surfaces being concentric with pipes to be welded, said upper surface being radially spaced further from said pipes than said lower surface,
  iv. a plurality of circular gears associated with each ring and operatively attached to said welding nozzle and in operative engagement with at least one of said gear-toothed surfaces, at least one circular gear being in engagement with each gear-toothed surface, and
  v. means for rotating at least one of said circular gears associated with each of said rings for powering said welding nozzle in its circumferential path around said pipes.

18. a welding assembly as recited in claim 17 further comprising
means for oscillating said welding nozzle in an oscillatory path as said welding nozzle is rotated in a circumferential path around said pipes during welding,
means for automatically powering said welding nozzle in a plurality of circumferential passes around said pipes at each pipe joint, and
means for automatically changing the oscillatory path in which said welding nozzle is moved during each circumferential pass around said pipes.

19. A welding assembly as recited in claim 18 wherein said means for oscillating said welding nozzle in an oscillatory path during welding comprises a plurality of cam means each selectively movable into operative relationship with said welding nozzle to oscillate same in a given oscillatory path.

20. A welding assembly as recited in claim 19, wherein said means for automatically changing the oscillatory path in which said welding nozzle is moved during each circumferential pass around said pipes includes a feeler disposed in front of said welding nozzle along its circumferential path of movement and disposed in the joint area between pipes to be welded together, and a cam selecting means in operative association with said feeler.

21. A welding assembly as recited in claim 18 wherein said means for automatically powering said welding nozzle in a plurality of circumferential passes around said pipes at said pipe joint automatically powers said welding nozzle around said pipes three times at said pipe joint, said means for automatically changing the oscillatory path in which said welding nozzle is moved during each circumferential pass around said pipe changing said oscillatory path so that said welding nozzle moves in a root pass as its first pass at said joint, an overlap pass as its second pass at said joint, and a wash pass as its third pass at said joint.

22. A welding assembly as recited in claim 17, wherein said means for spacing said rings horizontally apart a predetermined distance includes a plurality of turnbuckle members arranged circumferentially around said pipes, each turnbuckle member being in engagement with both of said rings.

23. A welding assembly as recited in claim 17 wherein three circular gears are provided associated with each of said rings, said circular gears being located generally at the vertises of an equilateral triangle, and an idler gear being located in a median portion between said circular gears and in operative engagement with each of said gears.

24. A welding assembly as recited in claim 23 further comprising a pair of alignment members extending between one of said circular gears and the other two of said circular gears.

25. A welding assembly as recited in claim 23 further comprising two sets of three circular gears each being associated with each ring.

* * * * *